(12) United States Patent
McCorkendale

(10) Patent No.: US 11,120,169 B1
(45) Date of Patent: Sep. 14, 2021

(54) SYSTEMS AND METHODS FOR IDENTIFYING MALWARE LOCATIONS BASED ON ANALYSES OF BACKUP FILES

(71) Applicant: Symantec Corporation, Mountain View, CA (US)

(72) Inventor: Bruce McCorkendale, Manhattan Beach, CA (US)

(73) Assignee: NortonLifeLock Inc., Tempe, AZ (US)

( * ) Notice: Subject to any disclaimer, the term of this patent is extended or adjusted under 35 U.S.C. 154(b) by 97 days.

(21) Appl. No.: 16/721,164

(22) Filed: Dec. 19, 2019

(51) Int. Cl.
| | |
|---|---|
| *G06F 11/14* | (2006.01) |
| *G06F 21/78* | (2013.01) |
| *G06F 21/56* | (2013.01) |
| *G06F 21/55* | (2013.01) |

(52) U.S. Cl.
CPC .......... *G06F 21/78* (2013.01); *G06F 11/1448* (2013.01); *G06F 21/554* (2013.01); *G06F 21/561* (2013.01); *G06F 21/564* (2013.01); *G06F 21/565* (2013.01)

(58) Field of Classification Search
CPC .............................. G06F 21/78; G06F 11/1448
See application file for complete search history.

(56) References Cited

U.S. PATENT DOCUMENTS

| | | | | |
|---|---|---|---|---|
| 10,437,994 | B1* | 10/2019 | Shen | H04L 63/1433 |
| 2002/0174349 | A1* | 11/2002 | Wolff | G06F 21/565 |
| | | | | 713/188 |
| 2011/0023120 | A1* | 1/2011 | Dai | G06F 21/56 |
| | | | | 726/23 |

OTHER PUBLICATIONS

Wikipedia, "Needleman—Wunsch algorithm", URL: https://en.wikipedia.org/wiki/Needleman%E2%80%93Wunsch_algorithm, Mar. 8, 2020, pp. 1-14.

* cited by examiner

*Primary Examiner* — Ponnoreay Pich
(74) *Attorney, Agent, or Firm* — FisherBroyles, LLP

(57) ABSTRACT

The disclosed computer-implemented method for identifying malware locations based on analyses of backup files may include (i) identifying a presence of a backup file set and (ii) performing a security action that may include (a) detecting, based on a scan of the backup file set, malware in the backup file set, (b) determining, based on a location of the malware in a system file structure of the backup file set, a subgraph of the system file structure of the backup file set that includes the malware, (c) identifying a string prefix for the subgraph of the system file structure of the backup file set, (d) using an index to cross-reference the string prefix to a pointer identifying a subgraph of an original file set, and (e) scanning a file in the subgraph of the original file set for the malware. Various other methods, systems, and computer-readable media are also disclosed.

20 Claims, 6 Drawing Sheets

SYSTEMS AND METHODS FOR IDENTIFYING MALWARE LOCATIONS BASED ON ANALYSES OF BACKUP FILES

BACKGROUND

Anti-malware scanners may not scan all files in storage devices because the storage devices have become of such high capacity that full scans of the storage devices cannot be completed prior to commencing next scheduled full scans. In some examples, full scans of high capacity storage devices cannot be completed by scanning only during idle times.

To accommodate constraints on anti-malware scanners caused by high capacity storage devices, anti-malware scans may be scheduled to run at system start-up and/or on file sets that may be common targets of malware. With these non-full scan optimizations, some files may never be scanned. In addition, files that have not changed since previously being scanned may not be not scanned again. However, sometimes infected files may be scanned without threats being detected and signature definitions that would be used by the anti-malware scanners to detect the threats become available after the infected files are scanned.

The present disclosure, therefore, identifies and addresses a need for systems and methods for identifying malware locations based on analyses of backup files.

SUMMARY

As will be described in greater detail below, the present disclosure describes various systems and methods for identifying malware locations based on analyses of backup files.

In one example, a method for identifying malware locations based on analyses of backup files may include (i) identifying, at a computing device, a presence of a backup file set and (ii) performing, at the computing device, a first security action. The first security action may include (a) detecting, based on a scan of the backup file set, malware in the backup file set, (b) determining, based on a location of the malware in a system file structure of the backup file set, a subgraph of the system file structure of the backup file set that includes the malware, (c) identifying a string prefix for the subgraph of the system file structure of the backup file set, (d) using an index to cross-reference the string prefix to a pointer identifying a subgraph of an original file set and (e) scanning a file in the subgraph of the original file set for the malware.

In some examples, the method may further include (i) scanning the backup file set to identify the subgraph of the system file structure of the backup file set and (ii) adding information describing the subgraph of the system file structure of the backup file set to a structural graph describing a system file structure of the backup file set.

In some examples, the method may further include (i) scanning the original file set to identify the subgraph of the system file structure of the original file set and (ii) adding information describing the subgraph of the system file structure of the original file set to a structural graph describing a system file structure of the original file set.

In an example, the method may further include (i) adding, to the index, the string prefix for the subgraph of the system file structure of the backup file set and (ii) adding, to the index, the pointer.

In an embodiment, the system file structure of the backup file set may be a directory hierarchy. In an embodiment, the string prefix for the subgraph of the system file structure of the backup file set may have a fixed length. In an embodiment, the fixed length may be configurable. In an embodiment, the file may be a compressed archive file.

In an embodiment, the method may further include (i) detecting the malware in the file and (ii) performing, in response to detecting the malware, a second security action in an attempt to ameliorate a potential security risk posed by the malware.

In one embodiment, a system for identifying malware locations based on analyses of backup files may include at least one physical processor and physical memory that includes computer-executable instructions that, when executed by the at least one physical processor, cause the at least one physical processor to (i) identify a presence of a backup file set and (ii) perform a security action. In examples, the security action may include (a) detecting, based on a scan of the backup file set, malware in the backup file set, (b) determining, based on a location of the malware in a system file structure of the backup file set, a subgraph of the system file structure of the backup file set that includes the malware, (c) identifying a string prefix for the subgraph of the system file structure of the backup file set, (d) using an index to cross-reference the string prefix to a pointer identifying a subgraph of an original file set, and (e) scanning a file in the subgraph of the original file set for the malware.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify, at the computing device, a presence of a backup file set and (ii) perform, at the computing device, a security action. In examples, the security action may include (a) detecting, based on a scan of the backup file set, malware in the backup file set, (b) determining, based on a location of the malware in a system file structure of the backup file set, a subgraph of the system file structure of the backup file set that includes the malware, (c) identifying a string prefix for the subgraph of the system file structure of the backup file set, (d) using an index to cross-reference the string prefix to a pointer identifying a subgraph of an original file set, and (e) scanning a file in the subgraph of the original file set for the malware.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
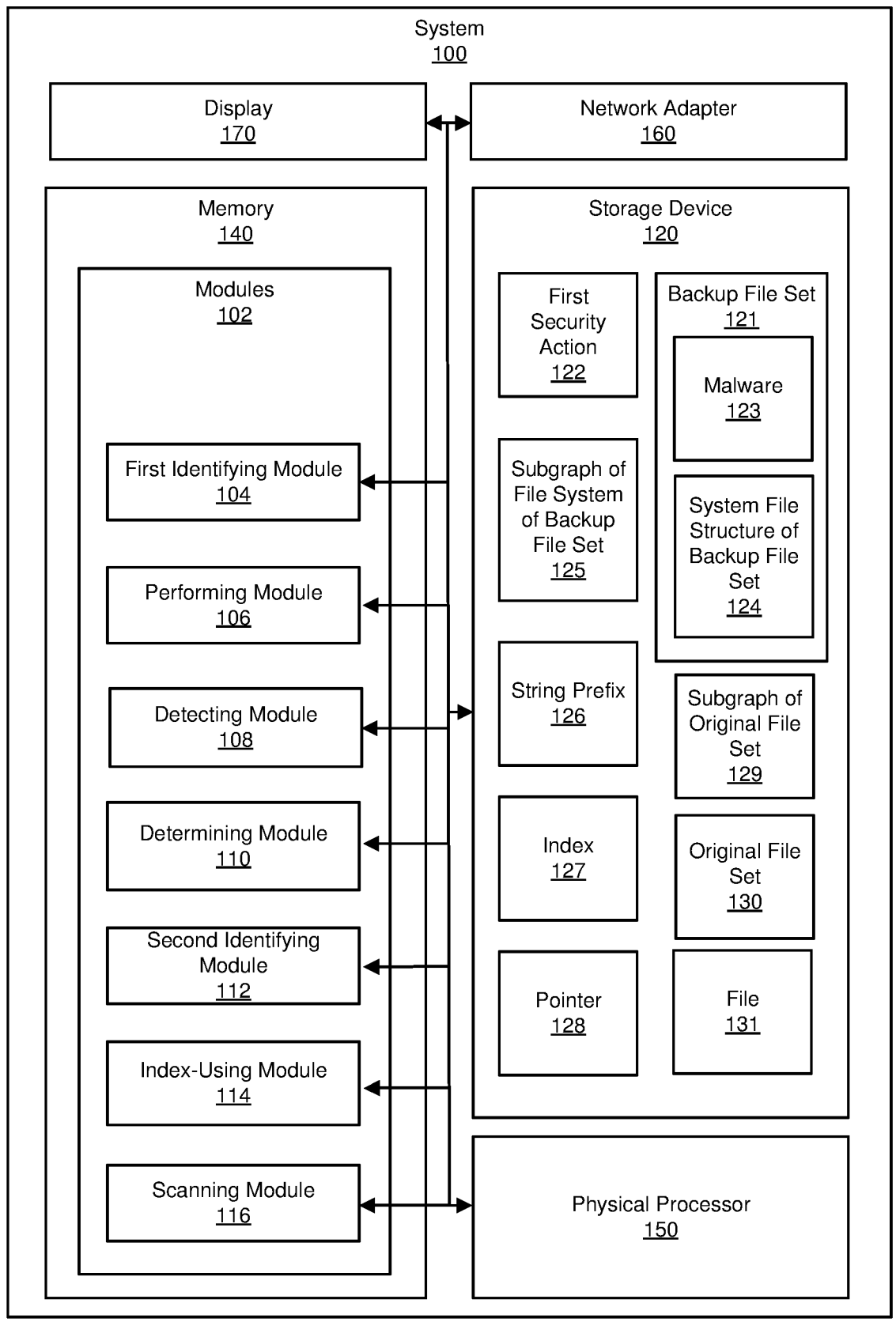
FIG. 1 is a block diagram of an example system for identifying malware locations based on analyses of backup files.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for identifying malware locations based on analyses of backup files.

The provided systems and methods address the aforementioned needs, as well as address shortcomings of malware scanners that avoid scanning all files in storage devices. The provided systems and methods also address issues of finding new threats for which malware signatures (e.g., definitions) have become available after an infected file is scanned. In examples, the provided systems and methods may detect newly-added storage devices that may include backup file sets, scan the backup file sets for malware, detect threats in and/or from the backup file sets (e.g., from malware), and scan original file sets for the malware in response to detecting the threats.

In some examples, malware scans may start scanning attached storage devices soon after the storage devices are attached, as attached storage devices may be used for temporarily storing backup files (e.g., from original files to backup files), permanently storing backup files, and/or for moving files between storage devices (i.e., copying files). The backup files stored on the attached storage devices may be organized in system file structures that mirror system file structures of original file sets from which the backup files are copied. Thus, when malware scanners detect malware in backup files and system file structures of backup files mirror system file structures of original file sets, it may be likely that corresponding files in matching system file structures in the original file sets are also infected with the malware. Thus, in examples, the provided systems and methods may detect system file structure matches and, when scanners detect malware within the system file structures of backup files, scan corresponding files within matching system file structures (e.g., in original files, in other backup files, and/or in copied files). In some examples, the provided systems and methods may detect system file structure matches and, when scanners detect malware within the system file structures of original files, scan corresponding files within matching system file structures (e.g., in the original files, in backup files, and/or in copied files).

In some examples, the provided systems and methods may be used for file scanning other than malware scanning. For example, the provided systems and methods may be used to scan files as part of Data Leakage Protection (DLP) techniques.

By doing so, the systems and methods described herein may advantageously improve security of computing devices and/or provide targeted protection against malware and/or malicious users. As such, the provided techniques may protect users by beneficially reducing security risks posed by malicious processes and/or malicious users, potentially resulting in significant time and/or monetary savings. In some embodiments, the provided techniques may advantageously improve accuracy of malware scanners. In some embodiments, the provided techniques may advantageously improve speed of malware scanners. In examples, the provided techniques may advantageously enhance performance of malware scanners. In some embodiments, the provided techniques may advantageously be implemented with low overhead. Also, disclosed systems and methods may provide asset protection for common targets of malware, such as hospitals, shipping companies, financial companies, governments, etc. by reducing malware detection times.

Figure 2:
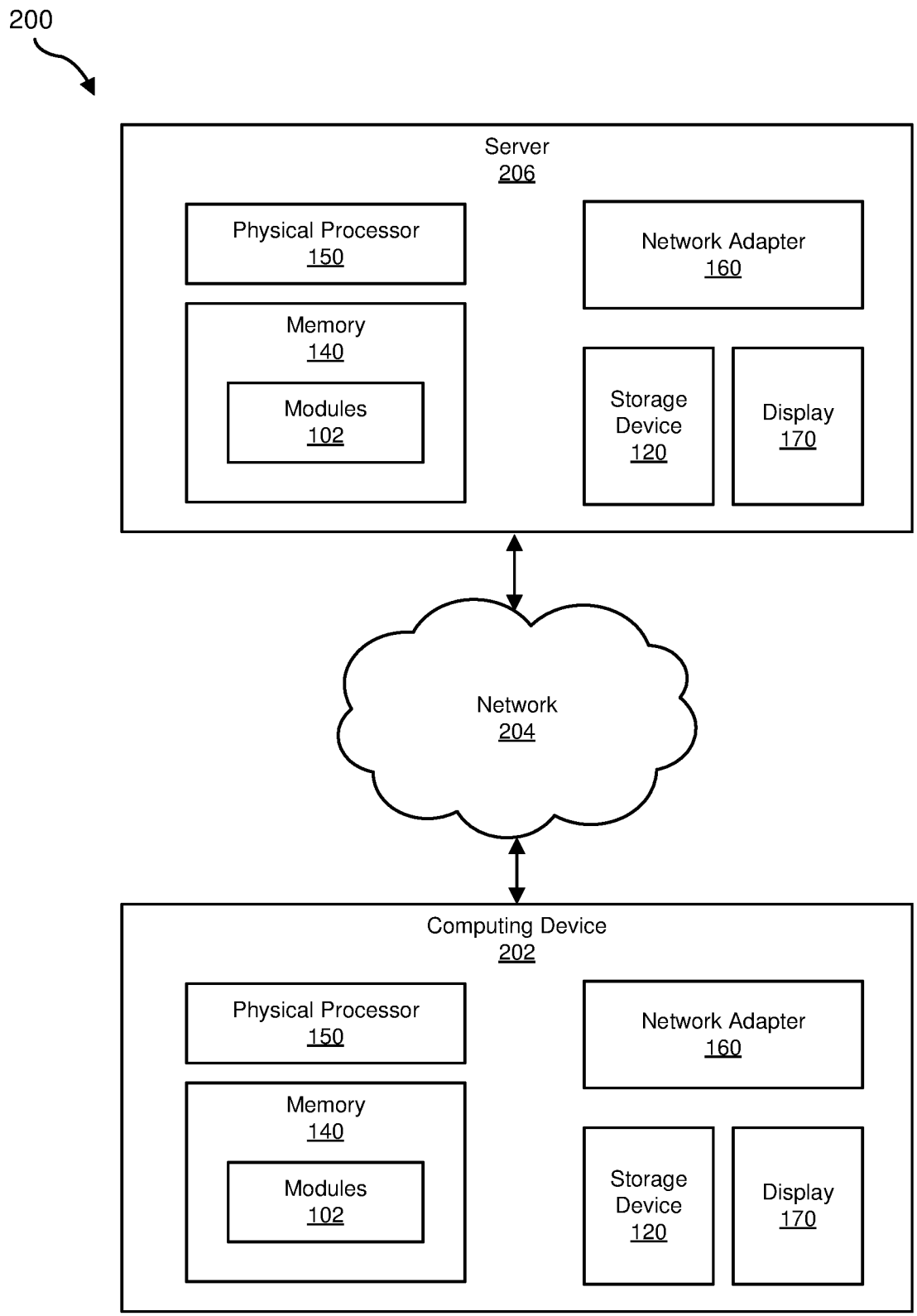
FIG. 2 is a block diagram of an additional example system for identifying malware locations based on analyses of backup files.
Figure 3:
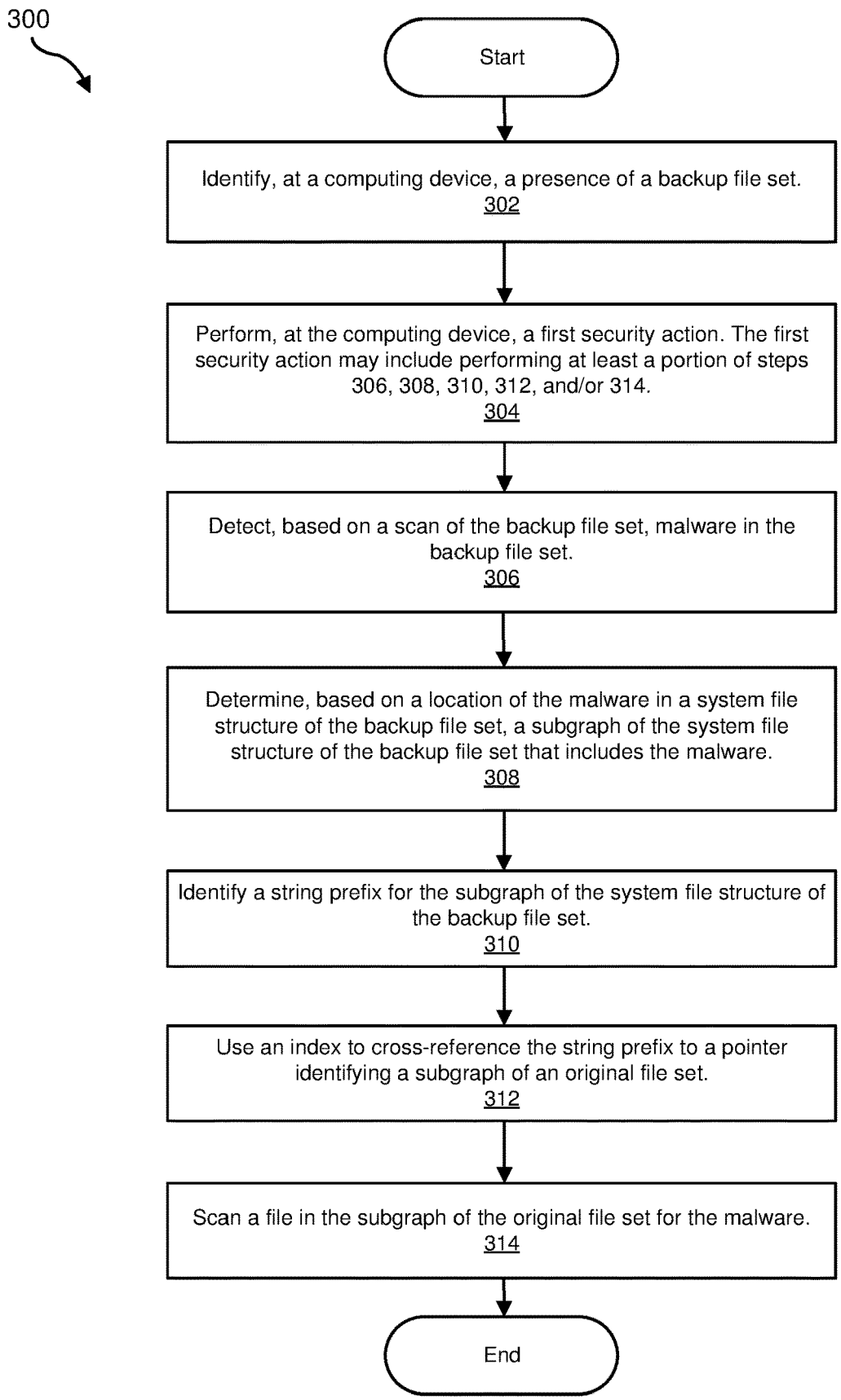
FIG. 3 is a flow diagram of an example method for identifying malware locations based on analyses of backup files.
Figure 4:
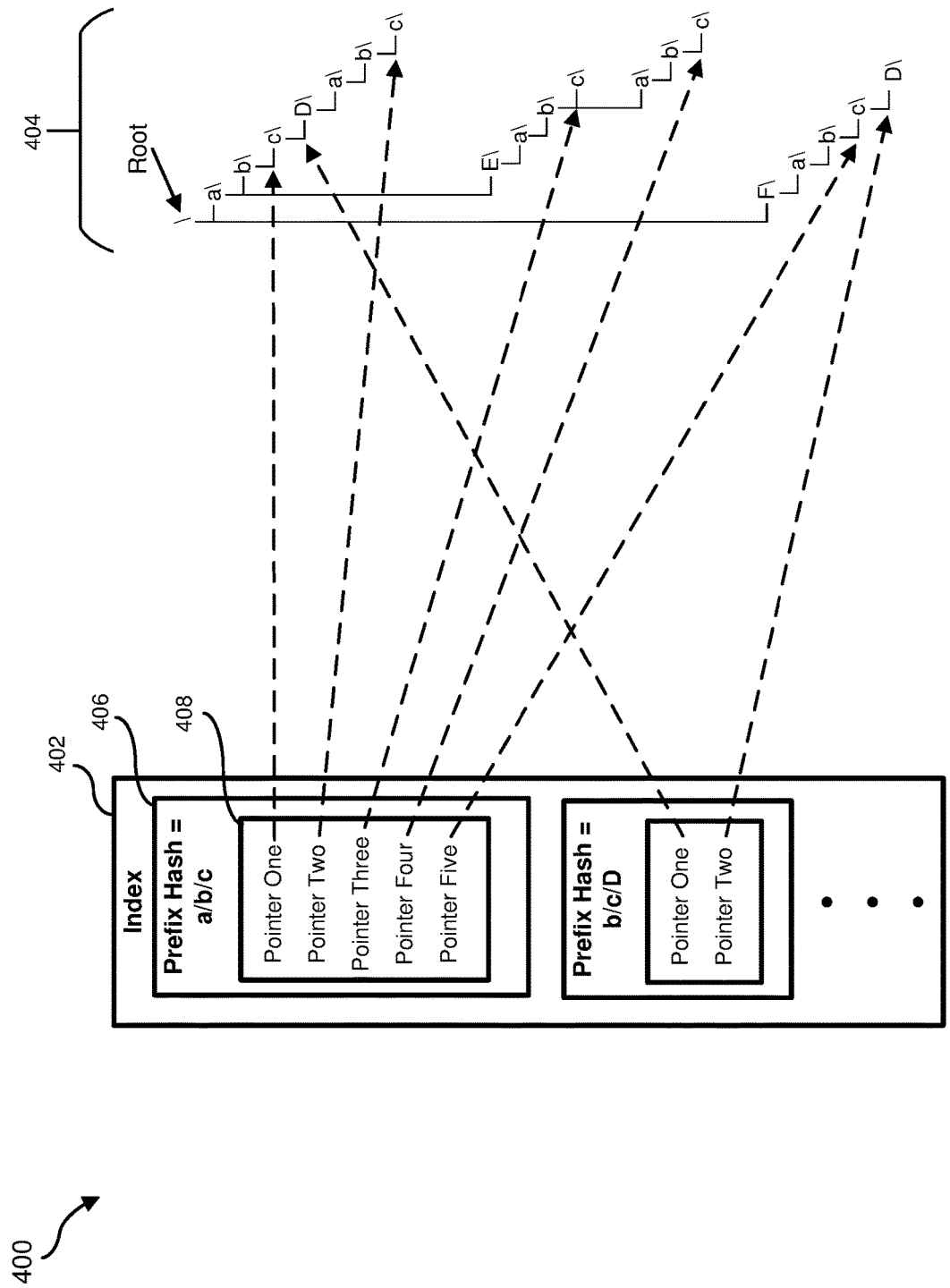
FIG. 4 is a diagram of an example index and respective system file structure.

The following will provide, with reference to FIGS. 1-2 and 4, detailed descriptions of example systems for identifying malware locations based on analyses of backup files. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of an example system 100 for identifying malware locations based on analyses of backup files. As illustrated in this figure, example system 100 may include one or more modules 102 for performing one or more tasks. As will be explained in greater detail below, modules 102 may include a first identifying module 104, a performing module 106, a detecting module 108, a determining module 110, a second identifying module 112, an index-using module 114, and/or a scanning module 116. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of a backup file set 121, a first security action 122, malware 123, a system file structure of a backup file set 124 (e.g., backup file set 121), a subgraph of a system file of backup file set 125 (e.g., backup file set 121), a string prefix 126, an index 127, a pointer 128, a subgraph of an original file set 129 (e.g., an original file set 130), original file set 130, and/or a file 131. In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, an attached storage device, variations or combinations of one or more of the same, and/or any other suitable storage memory.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 150. Physical processor 150 generally represents any type or form of hardware-implemented processing unit capable of interpreting and/or executing computer-readable instructions. In one example, physical processor 150 may access and/or modify one or more of modules 102 stored in memory 140. Additionally or alternatively, physical processor 150 may execute one or more of modules 102 to facilitate identifying malware locations based on analyses of backup files. Examples of physical processor 150 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more network adapters, such as network adapter 160. In some examples, network adapter 160 may be a physical network adapter connected to a physical network (e.g., network 204 in FIG. 2).

As illustrated in FIG. 1, example system 100 may also include one or more display devices, such as display 170. Display 170 generally represents any type or form of device capable of visually displaying information (e.g., to a user). In some examples, display 170 may present a graphical user interface. In non-limiting examples, display 170 may present at least a portion of information indicating one or more of backup file set 121, first security action 122, malware 123, system file structure of a backup file set 124 (e.g., backup file set 121), subgraph of a system file of backup file set 125 (e.g., backup file set 121), string prefix 126, index 127, pointer 128, subgraph of an original file set 129 (e.g., original file set 130), original file set 130, and/or file 131.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to identify malware locations based on analyses of backup files. For example, and as will be described in greater detail below, one or more of modules 102 may cause computing device 202 and/or server 206 to (i) identify a presence of backup file set 121 and (ii) perform first security action 122. In examples, first security action 122 may include (a) detecting, based on a scan of backup file set 121, malware 123 in backup file set 121, (b) determining, based on a location of malware 123 in system file structure of the backup file set 124, subgraph of the system file structure of the backup file set 125 that includes malware 123, (c) identifying string prefix 126 for subgraph of the system file structure of the backup file set 125, (d) using index 127 to cross-reference string prefix 126 to pointer 128 identifying subgraph of an original file set 129, and (e) scanning file 131 in the subgraph of the original file set 129 for malware 123.

Computing device 202 generally represents any type or form of computing device capable of reading computer-executable instructions. In some examples, computing device 202 may represent a computer running security software, such as cybersecurity software and/or privacy software. In some examples, computing device 202 may represent a computer running file backup software and/or file management software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that may be capable of reading computer-executable instructions. In some examples, server 206 may represent a computer running security software, such as cybersecurity software and/or privacy software. In some examples, server 206 may represent a computer running file backup software and/or file management software. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

FIG. 3 is a flow diagram of an example computer-implemented method 300 for identifying malware locations based on analyses of backup files. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple substeps, examples of which will be provided in greater detail below.

As illustrated in FIG. 3, at step 302 one or more of the systems described herein may identify presences of backup file sets. The systems described herein may perform step 302 in a variety of ways. In one example, first identifying module 104 may, as part of computing device 202 and/or server 206 in FIG. 2, identify a presence of backup file set 121.

In some examples, the provided techniques may require building and/or maintaining structural graphs of mounted system file structures. In some examples, the provided techniques may identify subgraphs from the structural graphs. Doing so may require analysis of the system file structures and/or incremental updates to the structural graphs as changes to the system file structures occur. Though file systems may be very large, analysis to obtain the structural graphs may be faster than scanning entireties of large file systems for malware.

In an embodiment, method 300 may further include scanning the backup file set to identify the subgraph of the system file structure of the backup file set. In an example, the system file structure of the backup file set may be a directory hierarchy. In some embodiments, method 300 may further include adding information describing a subgraph of the system file structure of the backup file set to a structural graph describing the system file structure of the backup file set. As used herein, a subgraph may include a structural graph of a system file structure that is less than an entirety of the structural graph describing the system file structure.

In an embodiment, method 300 may further include scanning the original file set to identify the subgraph of the system file structure of the original file set. In an example, the system file structure of the original file set may be a directory hierarchy. In some examples, method 300 may further include adding information describing the subgraph of the system file structure of the original file set to a structural graph describing a system file structure of the original file set.

In some examples, the provided systems and methods may create indices (e.g., index 127). In some examples, the indices may include maps of string prefixes (e.g., of a configurable fixed length) to respective vectors of pointers to matching locations in the structural graphs. In an example, method 300 may further include determining and/or adding to the indices, string prefixes for the subgraphs of the system file structures of the backup file sets. In an example, method 300 may further include adding the pointers to the indices. Thus, if a string prefix for a subgraph in a structural graph is known, matching subgraphs in corresponding other structural graphs (e.g., in other mounted file systems) can be found by cross-referencing (i.e. looking-up) the string prefix in the index to identify matching subgraphs in the corresponding other structural graphs and/or locations of the matching subgraphs in the corresponding other structural graphs.

In some examples, the provided systems and methods may detect malware in an infected folder in a backup file set, determine a prefix of the infected folder, determine a hash of the prefix, use the prefix hash and an index to find at least one respective pointer, and use the pointer(s) to identify other folders having the same name and prefix as the infected folder. Then the other folders having the same name and prefix as the infected folder may be scanned for the malware.

In a non-limiting embodiment, scanning a 2 TB solid state drive and creating a respective index may take less than four minutes. We now turn to FIG. 4.

FIG. 4 is a diagram 400 of an example index 402 based on a system file structure 404. The elements depicted in FIG. 4 are not limiting. The index 402 may include at least one prefix hash 406 and a vector of associated pointers 408. In some examples, at least one pointer in vector of associated pointers 408 may point to a portion of the system file structure (e.g., a substructure) that is the lowest level in the related prefix hash. For example, the prefix hash a\b\c has a lowest level (i.e., a deepest level) of "c". In some examples, at least one pointer in vector of associated pointers 408 may point to a portion of the system file structure that is the highest level in the related prefix hash. For example, the prefix hash "a\b\c" has a highest level of "a". Other possible prefix hashes in diagram 400 may include "b\c\D", "c\D\a", "D\a\b", and "a\E\a".

In an example, a vector of pointers in an index may be described as prefix_folder_map[P], where P=a prefix.

Returning to FIG. 3, at step 304 one or more of the systems described herein may perform security actions. The security actions may include performing at least a portion of steps 306, 308, 310, 312 and/or 314. The systems described herein may perform step 304 in a variety of ways. In one example, performing module 106 may, as part of computing device 202 and/or server 206 in FIG. 2, perform first security action 122. In some examples, first security action 122 may include performing at least a portion of steps 306, 308, 310, 312 and/or 314.

In some examples, first security action 122 may include blocking access to devices (e.g., storage devices, memories, network devices, etc.), allowing limited access to devices, allowing read-only access to devices, encrypting information, and/or other acts limiting access to devices. In some examples, first security action 122 may be performed automatically. In some embodiments, first security action 122 may attempt to identify and/or ameliorate potential security risks. In some examples, first security action 122 may include blocking access to and/or by executing processes. In additional examples, first security action 122 may include displaying, on user displays, warnings indicating that processes may be potentially dangerous.

As illustrated in FIG. 3, at step 306 one or more of the systems described herein may detect, based on scans of backup file sets, malware in the backup file sets. The systems described herein may perform step 306 in a variety of ways. In one example, detecting module 108 may, as part of computing device 202 and/or server 206 in FIG. 2, detect, based on a scan of backup file set 121, malware 123 in backup file set 121.

As illustrated in FIG. 3, at step 308 one or more of the systems described herein may determine, based on locations of the malware in system file structures of the backup file sets, subgraphs of the system file structures of the backup file sets that include the malware. The systems described herein may perform step 308 in a variety of ways. In one example, determining module 110 may, as part of computing device 202 and/or server 206 in FIG. 2, determine, based on a location of malware 123 in system file structure of the backup file set 124, subgraph of the system file structure of the backup file set 125 that includes malware 123.

In some examples, exact path matching may be used as an alternative to, or in conjunction with, subgraph matching.

As illustrated in FIG. 3, at step 310 one or more of the systems described herein may identify string prefixes for the subgraphs of the system file structures of the backup file sets. The systems described herein may perform step 310 in a variety of ways. In one example, second identifying module 112 may, as part of computing device 202 and/or server 206 in FIG. 2, identify string prefix 126 for subgraph of the system file structure of the backup file set 125.

In some embodiments, the string prefix for the subgraph of the system file structure of the backup file set may have a fixed length. In an example, the fixed length may be configurable (e.g., to a length of 1, 2, 3, etc.). In a non-limiting example, the prefix hash a\b\c has length of "3".

As illustrated in FIG. 3, at step 312 one or more of the systems described herein may use indices to cross-reference the string prefixes to pointers identifying subgraphs of original file sets. The systems described herein may perform step 312 in a variety of ways. In one example, index-using module 114 may, as part of computing device 202 and/or server 206 in FIG. 2, use index 127 to cross-reference string prefix 126 to pointer 128 identifying subgraph of an original file set 129.

As illustrated in FIG. 3, at step 314 one or more of the systems described herein may scan files in the subgraphs of the original file sets for the malware. The systems described herein may perform step 314 in a variety of ways. In one example, scanning module 116 may, as part of computing device 202 and/or server 206 in FIG. 2, scan file 131 in the subgraph of the original file set 129 for malware 123.

In some examples, file 131 may be a compressed archive file. Backup file sets and/or copy file sets may be in a compressed archive such as a ".zip" file. In some embodiments, the provided systems and methods may determine subgraphs of system file structures within such compressed archive files and perform at least a portion of steps 306, 308, 310, 312, and/or 314 on the compressed archive files.

In some examples, method 300 may further include detecting the malware in the file.

In some embodiments, method 300 may further include performing, in response to detecting the malware, a second security action in an attempt to ameliorate a potential security risk posed by the malware. In some examples, the second security action may include blocking access to devices (e.g., storage devices, memories, network devices, etc.), allowing limited access to devices, allowing read-only access to devices, encrypting information, and/or other acts limiting access to devices. In some examples, the second security action may be performed automatically. In some embodiments, the second security action may attempt to identify and/or ameliorate potential security risks. In some examples, the second security action may include blocking access to and/or by executing processes. In additional examples, the second security action may include displaying, on user displays, warnings indicating that processes may be potentially dangerous.

As detailed herein, the steps outlined in method 300 in FIG. 3 may advantageously improve security of computing devices and/or provide targeted protection against malware and/or malicious users. Examples of the provided techniques described herein may protect users by beneficially reducing security risks posed by malicious processes and/or malicious users. Examples of the disclosed systems and methods may advantageously improve accuracy, speed, and/or performance of malware scanners.

Figure 5:
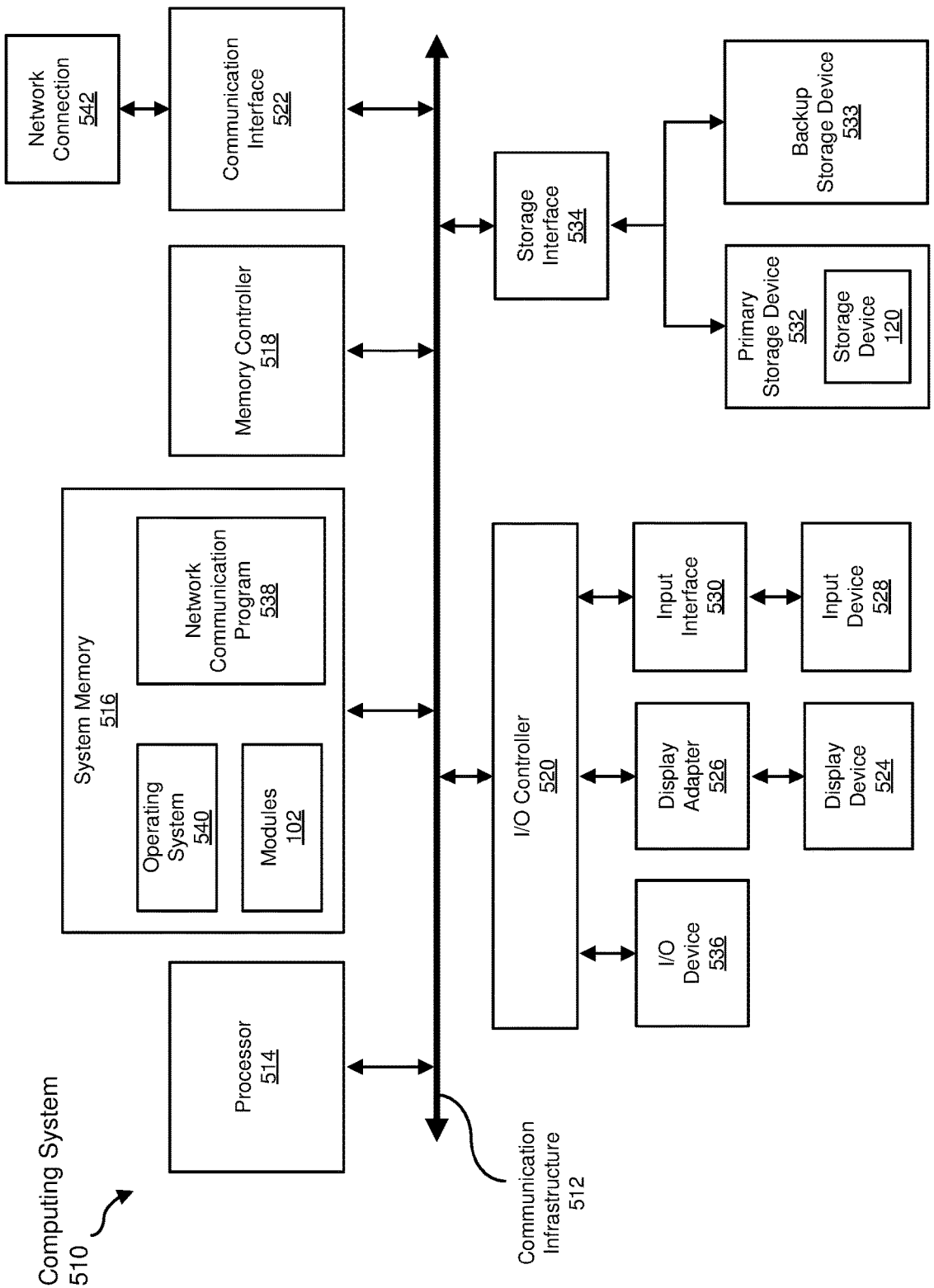
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, storage device 120 from FIG. 1 may be at least a portion of primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
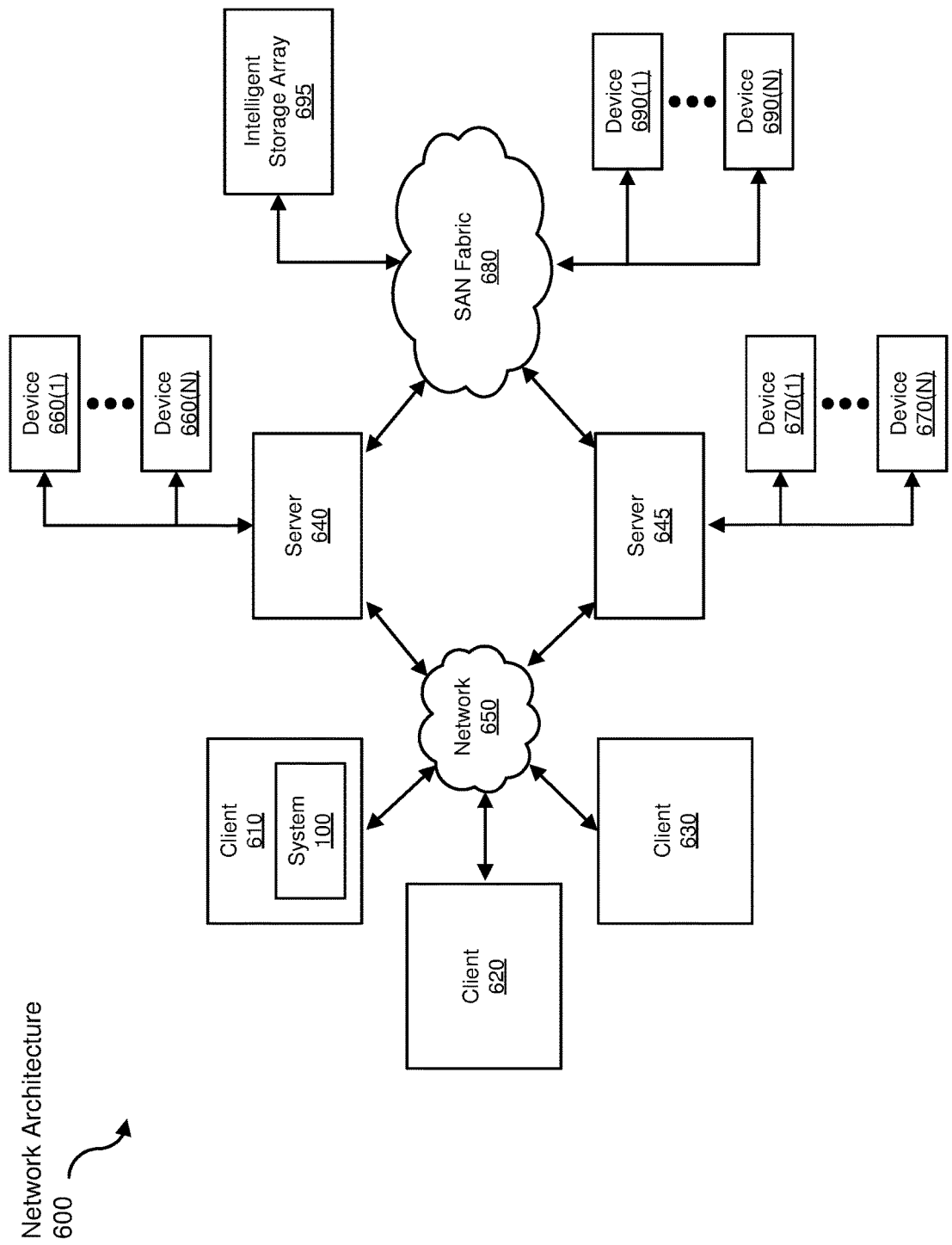
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the present disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network System file (NFS), Server Message Block (SMB), or Common Internet System file (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for identifying malware locations based on analyses of backup files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a system file filter) that presents the virtualization layer as though it were part of an underlying base operating system. For example, a software virtualization solution may redirect calls that are initially directed to locations within a base system file and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive system file structure data to be transformed, transform the system file structure data, output a result of the transformation to a display, use the result of the transformation to direct malware scanning, and store the result of the transformation to a tangible storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." In some examples, the singular may portend the plural. Finally, for ease of use, the terms "including" and "having" (and their derivatives), as used in the specification and claims, are interchangeable with and have the same meaning as the word "comprising."

What is claimed is:

1. A computer-implemented method for identifying malware locations based on analyses of backup files, at least a portion of the method being performed by a computing device comprising at least one processor, the method comprising:
    identifying, at the computing device, a presence of a backup file set; and
    performing, at the computing device, a first security action comprising:
        detecting, based on a scan of the backup file set, malware in the backup file set;
        determining, based on a location of the malware in a system file structure of the backup file set, a subgraph of the system file structure of the backup file set that includes the malware;
        identifying a string prefix for the subgraph of the system file structure of the backup file set;
        using an index to cross-reference the string prefix to a pointer identifying a subgraph of an original file set; and
        scanning a file in the subgraph of the original file set for the malware.

2. The method of claim 1, further comprising:
    scanning the backup file set to identify the subgraph of the system file structure of the backup file set; and
    adding information describing the subgraph of the system file structure of the backup file set to a structural graph describing a system file structure of the backup file set.

3. The method of claim 1, further comprising:
    scanning the original file set to identify the subgraph of the system file structure of the original file set; and
    adding information describing the subgraph of the system file structure of the original file set to a structural graph describing a system file structure of the original file set.

4. The method of claim 1, further comprising:
    adding, to the index, the string prefix for the subgraph of the system file structure of the backup file set; and
    adding, to the index, the pointer.

5. The method of claim 1, wherein the system file structure of the backup file set is a directory hierarchy.

6. The method of claim 1, wherein the string prefix for the subgraph of the system file structure of the backup file set has a fixed length.

7. The method of claim 6, wherein the fixed length is configurable.

8. The method of claim 1, wherein the file is a compressed archive file.

9. The method of claim 1, further comprising:
    detecting the malware in the file; and
    performing, in response to detecting the malware, a second security action in an attempt to ameliorate a potential security risk posed by the malware.

10. A system for identifying malware locations based on analyses of backup files, the system comprising:
    at least one physical processor;
    physical memory comprising computer-executable instructions that, when executed by the at least one physical processor, cause the at least one physical processor to:
        identify a presence of a backup file set; and
        perform a security action comprising:
            detecting, based on a scan of the backup file set, malware in the backup file set;
            determining, based on a location of the malware in a system file structure of the backup file set, a subgraph of the system file structure of the backup file set that includes the malware;
            identifying a string prefix for the subgraph of the system file structure of the backup file set;
            using an index to cross-reference the string prefix to a pointer identifying a subgraph of an original file set; and
            scanning a file in the subgraph of the original file set for the malware.

11. The system of claim 10, wherein the physical memory further comprises computer-executable instructions that, when executed by the at least one physical processor, cause the at least one physical processor to:
    scan the backup file set to identify the subgraph of the system file structure of the backup file set; and
    add information describing the subgraph of the system file structure of the backup file set to a structural graph describing a system file structure of the backup file set.

12. The system of claim 10, wherein the physical memory further comprises computer-executable instructions that, when executed by the at least one physical processor, cause the at least one physical processor to:
    scan the original file set to identify the subgraph of the system file structure of the original file set; and
    add information describing the subgraph of the system file structure of the original file set to a structural graph describing a system file structure of the original file set.

13. The system of claim 10, wherein the physical memory further comprises computer-executable instructions that, when executed by the at least one physical processor, cause the at least one physical processor to:
add, to the index, the string prefix for the subgraph of the system file structure of the backup file set; and
add, to the index, the pointer.

14. The system of claim 10, wherein the system file structure of the backup file set is a directory hierarchy.

15. The system of claim 10, wherein the string prefix for the subgraph of the system file structure of the backup file set has a fixed length.

16. A non-transitory computer-readable medium comprising one or more computer-executable instructions that, when executed by at least one processor of a computing device, cause the computing device to:
identify, at the computing device, a presence of a backup file set; and
perform, at the computing device, a security action comprising:
detecting, based on a scan of the backup file set, malware in the backup file set;
determining, based on a location of the malware in a system file structure of the backup file set, a subgraph of the system file structure of the backup file set that includes the malware;
identifying a string prefix for the subgraph of the system file structure of the backup file set;
using an index to cross-reference the string prefix to a pointer identifying a subgraph of an original file set; and
scanning a file in the subgraph of the original file set for the malware.

17. The non-transitory computer-readable medium of claim 16, further comprising computer-executable instructions that, when executed by the at least one processor, cause the computing device to:
scan the backup file set to identify the subgraph of the system file structure of the backup file set; and
add information describing the subgraph of the system file structure of the backup file set to a structural graph describing a system file structure of the backup file set.

18. The non-transitory computer-readable medium of claim 16, further comprising computer-executable instructions that, when executed by the at least one processor, cause the computing device to:
scan the original file set to identify the subgraph of the system file structure of the original file set; and
add information describing the subgraph of the system file structure of the original file set to a structural graph describing a system file structure of the original file set.

19. The non-transitory computer-readable medium of claim 16, further comprising computer-executable instructions that, when executed by the at least one processor, cause the computing device to:
add, to the index, the string prefix for the subgraph of the system file structure of the backup file set; and
add, to the index, the pointer.

20. The non-transitory computer-readable medium of claim 16, wherein the string prefix for the subgraph of the system file structure of the backup file set has a fixed length.

* * * * *